(12) United States Patent
Reiffenrath et al.

(10) Patent No.: US 6,399,162 B1
(45) Date of Patent: Jun. 4, 2002

(54) LIQUID-CRYSTALLINE MEDIUM

(75) Inventors: Volker Reiffenrath, Rossdorf; Brigitte Schuler, Haibach; Kazuaki Tarumi, Seeheim, all of (DE)

(73) Assignee: Merck Patent Gesellschaft mit beschrankter Haftung (DE)

(*) Notice: Subject to any disclaimer, the term of this patent is extended or adjusted under 35 U.S.C. 154(b) by 0 days.

(21) Appl. No.: 09/562,752

(22) Filed: May 2, 2000

(30) Foreign Application Priority Data

May 3, 1999 (DE) .......................... 199 20 125

(51) Int. Cl.$^7$ .................. C09K 19/34; C09K 19/30; C09K 19/12; C09K 19/42
(52) U.S. Cl. .............. 428/1.1; 252/299.61; 252/299.63; 252/299.66
(58) Field of Search ................ 252/299.63, 299.61, 252/299.66; 428/1.1

(56) References Cited

U.S. PATENT DOCUMENTS

| | | | | |
|---|---|---|---|---|
| 5,641,432 A | * | 6/1997 | Ohnishi et al. | 252/299.63 |
| 5,645,759 A | * | 7/1997 | Tomi et al. | 252/299.63 |
| 5,679,285 A | * | 10/1997 | Bartmann et al. | 252/299.63 |

\* cited by examiner

Primary Examiner—Shean C. Wu

(74) *Attorney, Agent, or Firm*—Millen, White, Zelano & Branigan, P.C.

(57) ABSTRACT

The invention relates to a liquid-crystalline medium based on a mixture of polar compounds of positive dielectric anisotropy, comprising one or more compounds of the general formula I

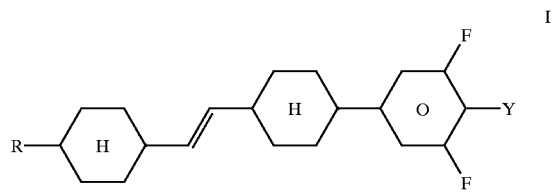

and simultaneously one or more compounds of the general formula II

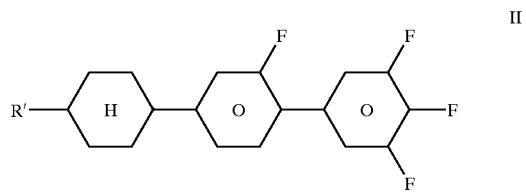

in which R is H or an alkyl or alkoxy radical having 1 to 15 carbon atoms, Y is F, $OCF_3$ or $OCHF_2$, and R', independent of the radical selected in the formula I, is as defined for R.

20 Claims, No Drawings

LIQUID-CRYSTALLINE MEDIUM

FIELD OF THE INVENTION

The present invention relates to a liquid-crystalline medium, and to the use thereof for electro-optical purposes, such as displays including this medium.

BACKGROUND OF THE INVENTION

Liquid-crystals may be used principally as dielectrics in display devices, because the optical properties of such substances can be modified by an applied voltage. Electro-optical devices based on liquid crystals are generally known to the person skilled in the art and can be based on various effects. Examples of such devices are, generally, cells having dynamic scattering, deformation of aligned phases (DAP) cells, guest/host cells, twisted nematic (TN) cells, supertwisted nematic (STN) cells, superbirefringence effect (SBE) cells and optical mode interference (OMI) cells. The commonest display devices may be based on the Schadt-Helfrich effect and have a twisted nematic structure.

The liquid-crystal materials should have good chemical and thermal stability and good stability to electric fields and electromagnetic radiation. Furthermore, the liquid-crystal materials should have low viscosity and produce short addressing times, low threshold voltages and high contrast in the cells.

They should furthermore have a suitable mesophase, for example a nematic or cholesteric mesophase, for the above-mentioned cells, in the usual operating temperatures, i.e. in the broadest possible range above and below room temperature. Because liquid crystals are generally used as mixtures of a plurality of components, it is important that the components can be readily miscible with one another. Further properties, such as the electrical conductivity, the dielectric anisotropy and the optical anisotropy, should satisfy various requirements depending on the cell type and area of application. For example, materials for cells having a twisted nematic structure should have positive dielectric anisotropy and low electrical conductivity.

For example, media having large positive dielectric anisotropy, broad nematic phases, relatively low birefringence, very high specific resistance, good UV and temperature stability and low vapor pressure are desired for matrix liquid-crystal (MLC) displays including integrated non-linear elements for switching individual pixels.

Matrix liquid-crystal displays of this type are generally known. Non-linear elements which can be used for individual switching of the individual pixels are, for example, active elements (i.e. transistors). Reference is then made to an "active matrix", where a distinction can be made between two types:

1. Metal oxide semiconductor (MOS) or other diodes on a silicon wafer as substrate.

2. Thin-film transistors (TFTs) on a glass plate as substrate.

The use of monocrystalline silicon as substrate material restricts the display size, since even modular assembly of various part-displays results in problems at the joints.

In the case of TFTs, which is preferred, the electro-optical effect used is usually the TN effect. A distinction is made between two technologies: TFTs comprising compound semiconductors, such as, for example, CdSe or TFTs based on polycrystalline or amorphous silicon. The latter technology is being worked on intensively worldwide.

The TFT matrix is applied to the inside of one glass plate of the display, while the other glass plate carries the transparent counterelectrode on its inside. In contrast to the size of the pixel electrode, the TFT is very small and has virtually no interfering effect on the image. This technology can also be expanded to fully color-compatible displays, in which a mosaic of red, green and blue filters is arranged in such a way that a filter element is opposite each switchable pixel.

The TFT displays usually operate as TN cells with crossed polarizers in transmission and are generally illuminated from the back.

The term MLC displays here covers any matrix display containing integrated non-linear elements, i.e., besides the active matrix, also displays containing passive elements, such as varistors or diodes (MIM=metal-insulator-metal).

MLC displays of this type may be particularly suitable for TV applications (for example pocket TVs) or for high-information displays for computer applications (laptops) and in automobile or aircraft construction. Besides problems regarding the angle dependence of the contrast and the response times, difficulties also often arise in MLC displays due to the insufficiently high specific resistance of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display worsens, and the problem of after-image elimination can occur. Because the specific resistance of the liquid-crystal mixture generally drops over the life of an MLC display owing to interaction with the interior surfaces of the display, a high (initial) resistance is very important in order to obtain acceptable service lives. In particular in the case of low-volt mixtures, it was hitherto impossible to achieve very high specific resistance values. It is furthermore desirable that the specific resistance exhibits the smallest possible increase with increasing temperature and after heating and/or UV exposure. The low-temperature properties of the mixtures of the prior art are also particularly disadvantageous. The demands are that no crystallization and/or smectic phases occur, even at low temperatures, and the temperature dependence of the viscosity is as low as possible. The MLC displays from the prior art thus do not meet today's requirements.

There thus continues to be a great demand for MLC displays having very high specific resistance at the same time as a large working-temperature range, short response times even at low temperatures and low threshold voltage which do not have these disadvantages, or only do so to a reduced extent.

In TN (Schadt-Helfrich) cells, media are desired which facilitate the following advantages in the cells:

expanded nematic phase range (in particular down to low temperatures)

switching at extremely low temperatures (outdoor use, automobile, avionics)

increased resistance to UV radiation (longer life)

The media available from the prior art do not allow these advantages to be achieved while simultaneously achieving the other parameters.

In the case of supertwisted (STN) cells, media are desired which enable greater multiplexability and/or lower threshold voltages and/or broader nematic phase ranges (in particular at low temperatures). To this end, a further increase in the available parameter latitude (clearing point, smectic-nematic transition or melting point, viscosity, dielectric parameters, elastic parameters) is urgently desired.

SUMMARY OF THE INVENTION

As used herein, the terms "include" or "have" mean to take in, enfold, or comprise as a discrete or subordinate part or item of a larger aggregate, group, or principle.

The invention has the feature of providing media, in particular for MLC, TN or STN displays of this type, which do not have the abovementioned disadvantages or only do so to a reduced extent, and preferably simultaneously have very high specific resistance values and low threshold voltages.

It has now been found that this feature can be achieved if media according to the invention are used in displays.

The invention thus relates to a liquid-crystalline medium based on a mixture of polar compounds of positive dielectric anisotropy, including one or more compounds of the formula I

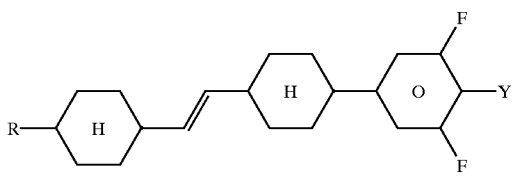

in which
R is H or an alkyl or alkoxy radical having 1 to 15 carbon atoms,
Y is F, $OCF_3$ or $OCHF_2$,
and simultaneously one or more compounds of the formula II

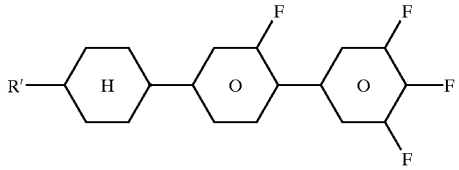

in which R', independently of the radical selected in the formula I, is as defined for R.

The compounds of the formulae I and II have a broad range of applications. Depending on the choice of substituents, these compounds can serve as base materials of which liquid-crystalline media are predominantly composed; however, it is also possible to add compounds of the formulae I and II to liquid-crystalline base materials from other classes of compound in order, for example, to modify the dielectric and/or, in particular, the optical anisotropy of a dielectric of this type and/or to optimize its threshold voltage and/or its viscosity.

In the pure state, the compounds of the formulae I and II are colorless and form liquid-crystalline mesophases in a temperature range which is favorably located for electro-optical use. They are stable chemically, thermally and to light.

Compounds of the formula I have already been disclosed in DE 195 05 189 A1.

Compounds of the formula II have already been disclosed in, for example, DE 195 28 301 A1 and DE 195 28 085 A1.

In the media according to the invention comprising compounds of the formulae I and II, Y is preferably F or $OCF_3$, in particular F.

If R and/or R' is an alkyl radical and/or an alkoxy radical, this can be straight-chain or branched. It is preferably straight-chain, has 2, 3, 4, 5, 6 or 7 carbon atoms and accordingly is preferably ethyl, propyl, butyl, pentyl, hexyl, heptyl, ethoxy, propoxy, butoxy, pentoxy, hexoxy or heptoxy, furthermore methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

Compounds of the formulae I and II including branched wing groups R and/or R' may occasionally be of importance owing to better solubility in the conventional liquid-crystalline base materials, but in particular as chiral dopants if they are optically active. Smectic compounds of this type are suitable as components of ferroelectric materials.

Compounds of the formula I having $S_A$ phases are suitable, for example, for thermally addressed displays.

Branched groups of this type generally include not more than one chain branch. Preferred branched radicals R and/or R' are isopropyl, 2-butyl (=1-methylpropyl), isobutyl (=2-methylpropyl), 2-methylbutyl, isopentyl (=3-methylbutyl), 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

R and/or R' are very particularly preferably methyl, ethyl, n-propyl, n-pentyl or n-heptyl.

The compounds of the formulae I and II are prepared by methods known per se, as described in the literature (for example in the standard works, such as Houben-Weyl, Methoden der Organischen Chemie [Methods of Organic Chemistry], Georg-Thieme-Verlag, Stuttgart), to be precise under reaction conditions which are known and suitable for said reactions. Use can also be made here of variants which are known per se, but are not mentioned here in greater detail.

The compounds of the formulae I and II can be prepared, for example, as described in DE 195 05 189 A1 or DE 195 28 301 A1.

The invention can also relate to electro-optical displays (in particular STN or MLC displays having two plane-parallel outer plates, which, together with a frame, form a cell, integrated non-linear elements for switching individual pixels on the outer plates, and a nematic liquid-crystal mixture of positive dielectric anisotropy and high specific resistance which is located in the cell) which include media of this type, and to the use of these media for electro-optical purposes.

The liquid-crystal mixtures according to the invention allow a significant increase in the parameter latitude which is available.

The achievable combinations of clearing point, viscosity at low temperature, thermal and UV stability and dielectric anisotropy are far superior and unexpected to the known materials from the prior art.

The requirement for a low threshold voltage, a nematic phase at low temperature and high $\Delta\epsilon$ has hitherto only been achieved inadequately. Although systems such as, for example, ZLI-3119 (Merck, Darmstadt) have high clearing points and favorable viscosities, they have, however, a $\Delta\epsilon$ of only +3.

Other mixture systems have comparable viscosities and $\Delta\epsilon$ values, but have only relatively high values of the threshold voltage.

While retaining the nematic phase down to about −20° C. and preferably down to about −30° C., particularly preferably down to about −40° C., the liquid-crystal mixtures according to the invention allow extremely low threshold voltages of below about 1.4 V, preferably of below about 1.2 V, especially of below about 1.1 V, simultaneously dielectric anisotropy values Δε of ≧ about 8, preferably ≧ about 10, and a high value for the specific resistance to be achieved, enabling excellent STN and MLC displays to be obtained. In particular, the mixtures are characterized by small operating voltages.

The MLC displays according to the invention preferably operate at the first Gooch and Tarry transmission minimum [C. H. Gooch and H. A. Tarry, Electron. Lett. 10, 2–4, 1974; C. H. Gooch and H. A. Tarry, Appl. Phys., Vol. 8, 1575–1584, 1975], where, besides particularly favorable electro-optical properties, such as, for example, high steepness of the characteristic line and low angle dependence of the contrast (German Patent 30 22 818), a lower dielectric anisotropy is sufficient at the same threshold voltage as in an analogous display at the second minimum. Thus, significantly higher specific resistance values can be achieved using the mixtures according to the invention at the first minimum than in the case of mixtures comprising cyano compounds. Through a suitable choice of the individual components and their proportions by weight, the person skilled in the art can set the birefringence necessary for a specified layer thickness of the MLC display using simple routine methods.

The rotational viscosity at about 20° C. is preferably < about 200 mPa.s, particularly preferably < about 150 mPa.s. The nematic phase range is preferably at least about 90° C., in particular at least about 100° C. This range preferably extends at least from about −20° C. to + about 80° C.

Measurements of the capacity holding ratio (HR) [S. Matsumoto et al., Liquid Crystals 5, 1320 (1989); K. Niwa et al., Proc. SID Conference, San Francisco, June 1984, p. 304 (1984); G. Weber et al., Liquid Crystals 5, 1381 (1989)] have shown that mixtures according to the invention comprising compounds of the formulae I and II exhibit only a slight drop in HR with temperature.

The UV stability of the mixtures according to the invention is also excellent, i.e. they exhibit only a slight drop in HR on exposure to UV.

The media according to the invention are preferably based on a plurality (preferably two to 4) of compounds of the formula I, i.e. the proportion of these compounds is from about 5 to about 85%, preferably from about 10 to about 60%, particularly preferably in the range from about 20 to about 50%, and on a plurality (preferably two to 4) of compounds of the formula II, i.e. the proportion of these compounds is from about 5 to about 85%, preferably about 10 to about 60%, particularly preferably in the range from about 20 to about 50%.

The sum of the proportions of the compounds of the formulae I and II is preferably from about 10 to about 95%, preferably from about 15 to about 80%, particularly preferably from about 20 to about 70%.

The individual compounds of the formulae I to XX and their sub-formulae which can be used in the media according to the invention are either known or can be prepared analogously to the known compounds.

Preferred embodiments are indicated below.

The medium may also include one or more compounds of the group with the general formulae III to X:

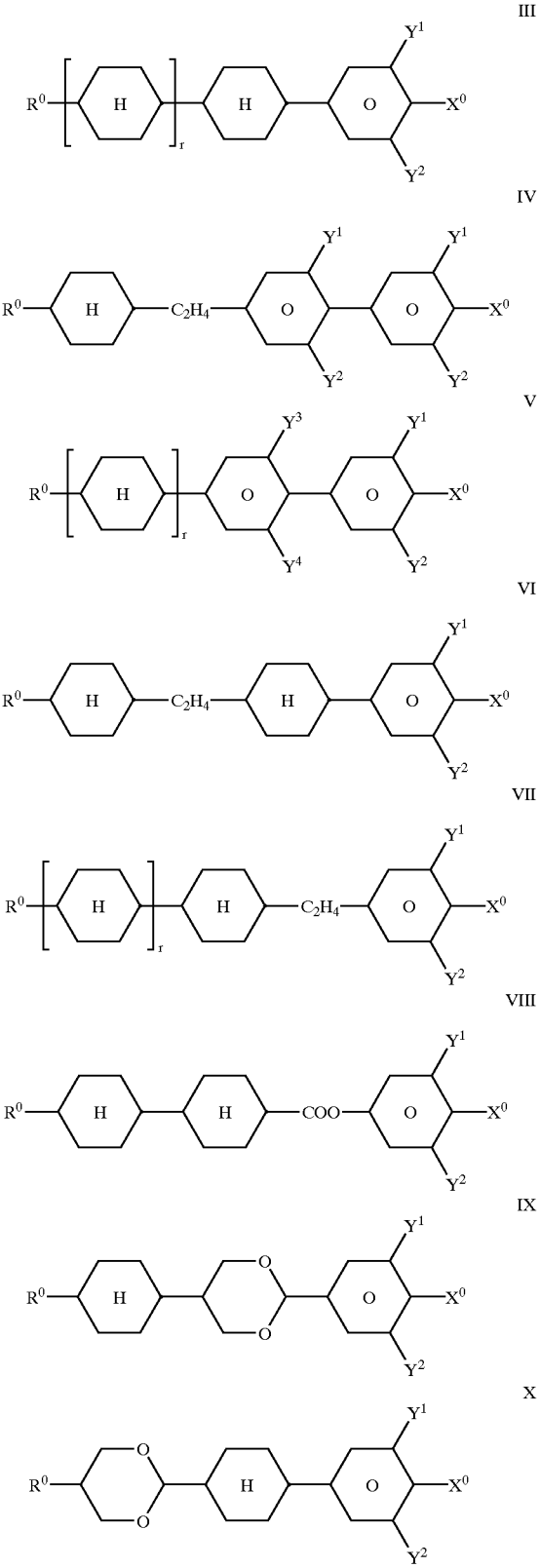

in which the individual radicals have the following meanings:

$R^0$: n-alkyl, oxaalkyl, fluoroalkyl or alkenyl, in each case having up to 9 carbon atoms;

$X_0$: F, Cl, halogenated alkyl, alkenyl or alkoxy having 1 to 6 carbon atoms;
$Y^1$ and $Y^2$: each, independent of one another, H or F;
$Y^3$ and $Y^4$: simultaneously H or F;
r: 0 or 1.

The medium, in addition to the compounds of the formulae I and II, may also include the compounds of the formulae IIIa, IIIb, IIIc, IIId and/or IIIe:

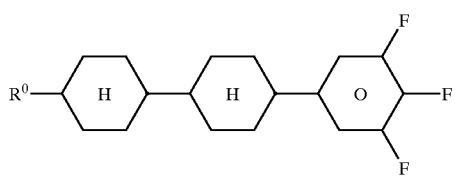
IIIa

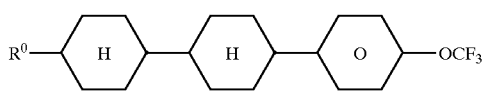
IIIb

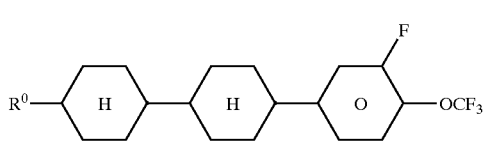
IIIc

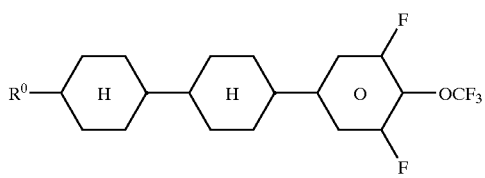
IIId

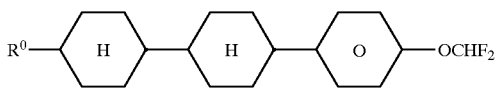
IIIe

The compound of the formula V is preferably

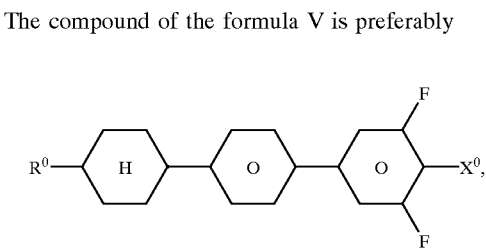
Va

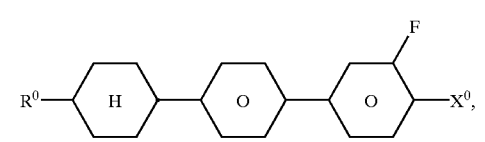
Vb

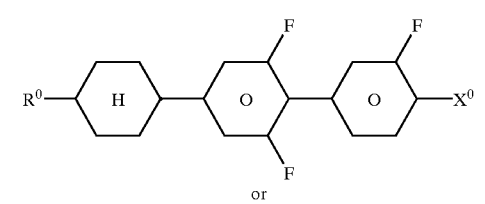
Vc or

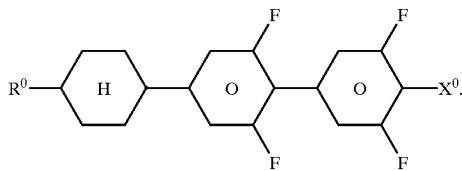
Vd

The medium may also include one or more compounds selected from the group of the compounds with general formulae XI to XVI:

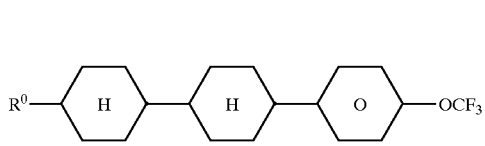
XI

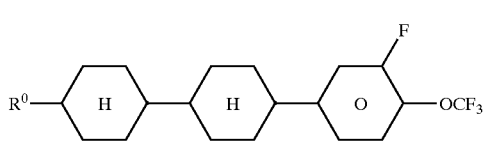
XII

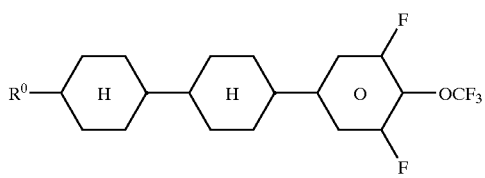
XIII

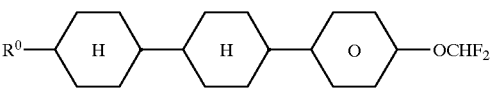
XIV

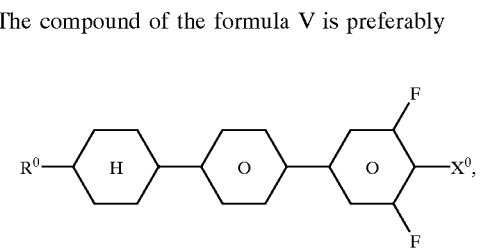
XV

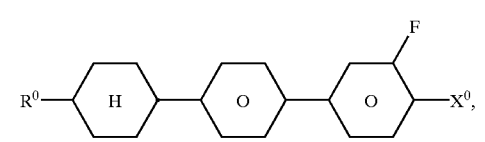
XVI

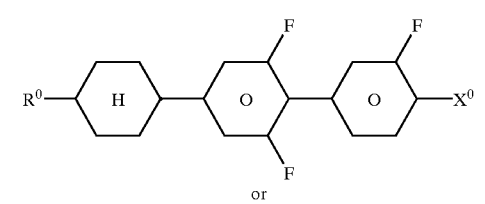

in which $R^0$, $X^0$, $Y^1$ and $Y^2$ are each, independent of one another, as defined above. $X^0$ is preferably F, Cl, $CF_3$, $OCF_3$, $OCHF_2$, alkyl, oxaalkyl, fluoroalkyl or alkenyl, in each case having up to 6 carbon atoms, $R^0$ is preferably alkyl or alkoxy having 1 to 7 carbon atoms, and $Y^1$ and $Y^2$ are preferably F;

The proportion of compounds of the formulae I to X together in the mixture as a whole is at least about 50% by weight;

The proportion of compounds of the formulae III to XVI in the mixture as a whole is from about 5 to about 90% by weight;

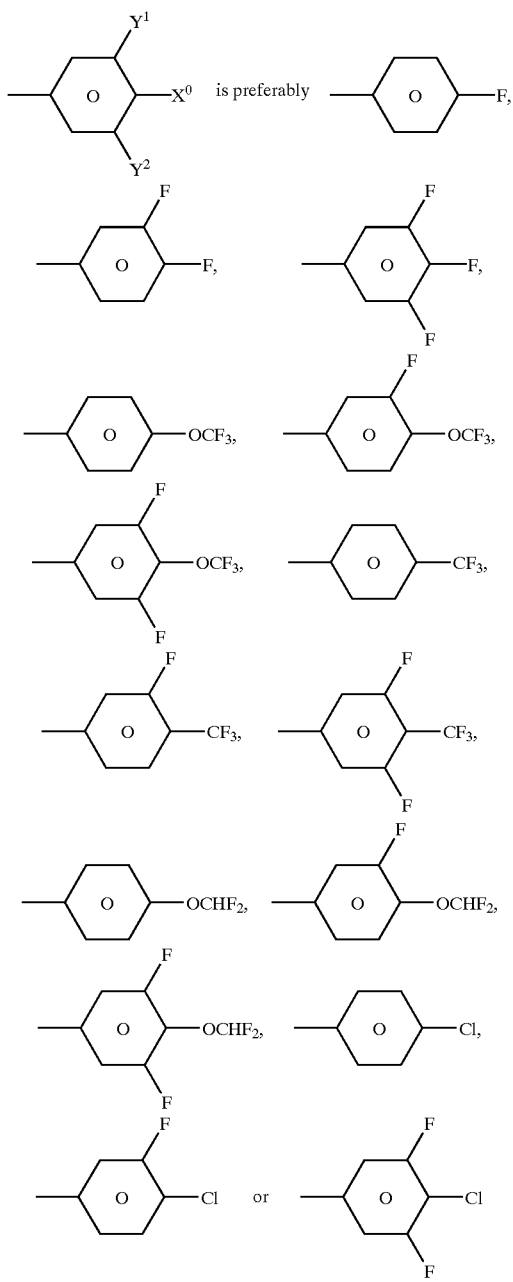

The medium may include compounds of the formulae III, IV, V and/or VII $R^0$ is straight-chain alkyl having 2 to 7 carbon atoms The medium may essentially consist of compounds of the formulae I to VII The medium may essentially consist of compounds of the formulae I to III The medium may further include compounds, preferably selected from the following general formulae XVII to XX:

XVII

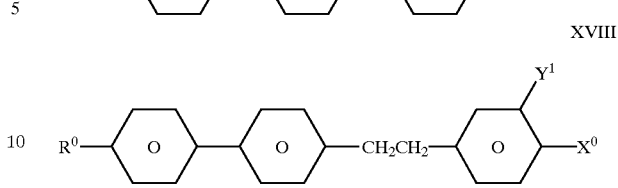

XVIII

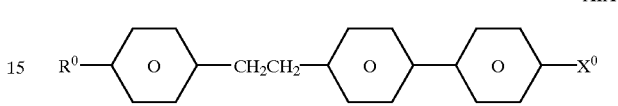

XIX

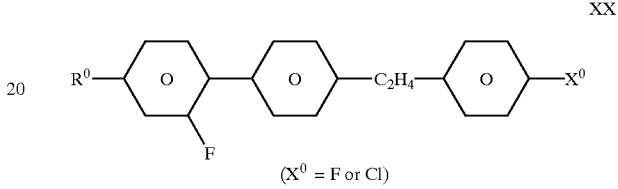

XX ($X^0$ = F or Cl)

in which $R^0$ and $X^0$ are as defined above, and the 1,4-phenylene rings may be substituted by CN, chlorine or fluorine. The 1,4-phenylene rings are preferably mono- or polysubstituted by fluorine atoms.

The (I+II):(III+IV+V+VI+VII) weight ratio is preferably about 1:about 10 to about 10:about 1, in particular from about 1:about 4 to about 4:about 1.

The medium may essentially consist of compounds selected from the group consisting of the general formulae I to XVI.

It has been found that even a relatively small proportion of compounds of the formulae I and II mixed with conventional liquid-crystal materials, but in particular with one or more compounds of the formulae III, IV, V, VI and/or VII, results in a significant reduction in the threshold voltage and low birefringence values, where broad nematic phases with low smectic-nematic transition temperatures are simultaneously observed, improving the storage stability. Particular preference is given to mixtures which, in addition or one or more compounds of the formula I, may include one or more compounds of the formula III, in particular of the formula IIIa and/or IIIb. Desirably, the compounds of the formulae I to XX are colorless, stable and readily miscible with one another and with other liquid-crystalline materials.

The term "alkyl" preferably covers straight-chain and branched alkyl groups having 1–7 carbon atoms, in particular the straight-chain groups methyl, ethyl, propyl, butyl, pentyl, hexyl and heptyl. Groups having 2–5 carbon atoms are generally preferred.

The term "alkenyl" preferably covers straight-chain and branched alkenyl groups having 2–7 carbon atoms, in particular the straight-chain groups. Particularly preferred alkenyl groups are $C_2$–$C_7$-1E-alkenyl, $C_4$–$C_7$-3E-alkenyl, $C_5$–$C_7$-4-alkenyl, $C_6$–$C_7$-5-alkenyl and $C_7$-6-alkenyl, in particular $C_2$–$C_7$-1E-alkenyl, $C_4$–$C_7$-3E-alkenyl and $C_5$–$C_7$-4-alkenyl. Examples of preferred alkenyl groups are vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4Z-hexenyl, 4E-hexenyl, 4Z-heptenyl, 5-hexenyl, 6-heptenyl and the like. Groups having up to 5 carbon atoms are generally preferred.

The term "fluoroalkyl" preferably covers straight-chain groups having a terminal fluorine, i.e. fluoromethyl, 2-fluoroethyl, 3-fluoropropyl, 4-fluorobutyl, 5-fluoropentyl, 6-fluorohexyl and 7-fluoroheptyl. However, other positions of the fluorine are not excluded.

The term "oxaalkyl" preferably covers straight-chain radicals of the formula $C_nH_{2n+1}$—O—$(CH_2)$m, in which n and m are each, independent of one another, from 1 to 6. Preferably, n is 1 and m is from 1 to 6.

Through suitable choice of the meanings of $R^0$ and $X^0$, the addressing times, the threshold voltage, the steepness of the transmission characteristic lines, etc., can be modified in the desired manner. For example, 1E-alkenyl radicals, 3E-alkenyl radicals, 2E-alkenyloxy radicals and the like generally result in short addressing times, improved nematic tendencies and a higher ratio of the elastic constants $k_{33}$ (bend) and $k_{11}$ (splay) compared with alkyl or alkoxy radicals. 4-Alkenyl radicals, 3-alkenyl radicals and the like generally give lower threshold voltages and smaller values of $k_{33}/k_{11}$ compared with alkyl and alkoxy radicals.

A —$CH_2CH_2$— group generally results in higher values of $k_{33}/k_{11}$ compared with a single covalent bond. Higher values of $k_{33}/k_{11}$ facilitate, for example, flatter transmission characteristic lines in TN cells with a 90° twist (in order to achieve grey shades) and steeper transmission characteristic lines in STN, SBE and OMI cells (higher multiplexability), and vice versa.

The optimum mixing ratio of the compounds of the formulae (I+II) to (III+IV+V+VI and VII) depends substantially on the desired properties, on the choice of the components of the formulae I, II, III, IV, V, VI and/or VII, and on the choice of any other components which may be present. Suitable mixing ratios within the range given above can easily be determined from case to case.

The total amount of compounds of the formulae I to XX in the mixtures according to the invention may be varied. The mixtures can therefore include one or more further components in order to optimize various properties. However, the observed effect on the addressing times and the threshold voltage is generally greater the higher the total concentration of compounds of the formulae I to XX.

In a particularly preferred embodiment, the media according to the invention can include compounds of the formulae III to VII (preferably III and/or V, in particular IIIa and IIIb). A favorable synergistic effect with the compounds of the formulae I and II results in particularly advantageous properties. In particular, mixtures including compounds of the formulae I and II and of the formula III are distinguished by their low threshold voltages at the same time as high dielectric anisotropy values.

The construction of the STN or MLC display according to the invention from polarizers, electrode base plates and surface-treated electrodes corresponds to the conventional construction for displays of this type. The term "conventional construction" is broadly drawn here and also covers all derivatives and modifications of the MLC display, in particular including matrix display elements based on poly-Si TFT or MIM.

A significant difference between the displays according to the invention and the conventional displays based on the twisted nematic cell consists, however, in the choice of the liquid-crystal parameters of the liquid-crystal layer.

The liquid-crystal mixtures which can be used in accordance with the invention are prepared in a manner conventional per se. In general, the desired amount of the components used in a lesser amount is dissolved in the components making up the principal constituent, expediently at elevated temperature. It is also possible to mix solutions of the components in an organic solvent, for example in acetone, chloroform or methanol, and to remove the solvent again after thorough mixing, for example by distillation. The dielectrics may also include further additives known to the person skilled in the art and described in the literature. For example, 0 to about 15% of pleochroic dyes and/or chiral dopants can be added.

C denotes a crystalline phase, S a smectic phase, SC a smectic C phase, N a nematic phase and I the isotropic phase.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure[s] of all applications, patents and publications, cited above or below, and of corresponding German application No. 19920125.0, filed May 3, 1999 is hereby incorporated by reference.

EXPERIMENTS $V_{10}$ denotes the voltage for about 10% transmission (viewing direction perpendicular to the plate surface). $t_{on}$ denotes the switch-on time and $t_{off}$ the switch-off time at an operating voltage corresponding to about 2.5 times the value of $V_{10}$. (Δn denotes the optical anisotropy, and $n_0$ the refractive index. Δε denotes the dielectric anisotropy (Δε= $ε_∥-ε_⊥$, where $ε_∥$ denotes the dielectric constant parallel to the longitudinal axis of the molecules, and $ε_⊥$ denotes the dielectric constant perpendicular thereto). The electro-optical data were measured in a TN cell at the 1st minimum (i.e. at a d·Δn value of 0.5) at about 20° C., unless expressly stated otherwise. The optical data was measured at about 20° C., unless expressly stated otherwise.

In the present application and in the examples below, the structures of the liquid-crystal compounds are indicated by means of acronyms, the transformation into chemical formulae taking place in accordance with Tables A and B below. All radicals $C_nH_{2n+1}$ and $C_mH_{2m+1}$ are straight-chain alkyl radicals having n and m carbon atoms respectively. The coding in Table B is self-evident. In Table A, only the acronym for the parent structure is given, followed, separated from the acronym for the parent structure by a hyphen, by a code for the substituents $R^1$, $R^2$, $L^1$ and $L^2$:

| Code for $R^1$, $R^2$, $L^1$, $L^2$ | $R^1$ | $R^2$ | $L^1$ | $L^2$ |
|---|---|---|---|---|
| nm | $C_nH_{2n+1}$ | $C_mH_{2m+1}$ | H | H |
| nOm | $C_nH_{2n+1}$ | $OC_mH_{2m+1}$ | H | H |
| nO.m | $OC_nH_{2n+1}$ | $C_mH_{2m+1}$ | H | H |
| n | $C_nH_{2n+1}$ | CN | H | H |
| nN.F | $C_nH_{2n+1}$ | CN | H | F |
| nF | $C_nH_{2n+1}$ | F | H | H |
| nOF | $OC_nH_{2n+1}$ | F | H | H |
| nCl | $C_nH_{2n+1}$ | Cl | H | H |
| nF.F | $C_nH_{2n+1}$ | F | H | F |
| nF.F.F | $C_nH_{2n+1}$ | F | F | F |
| nCF$_3$ | $C_nH_{2n+1}$ | CF$_3$ | H | H |
| nOCF$_3$ | $C_nH_{2n+1}$ | OCF$_3$ | H | H |
| nOCF$_2$ | $C_nH_{2n+1}$ | OCHF$_2$ | H | H |
| nS | $C_nH_{2n+1}$ | NCS | H | H |
| rVsN | $C_rH_{2r+1}$—CH=CH—$C_sH_{2s}$— | CN | H | H |

-continued
| Code for $R^1$, $R^2$, $L^1$, $L^2$ | $R^1$ | $R^2$ | $L^1$ | $L^2$ |
|---|---|---|---|---|
| rEsN | $C_rH_{2r+1}$—O—$C_sH_{2s}$— | CN | H | H |
| nAm | $C_nH_{2n+1}$ | $COOC_mH_{2m+1}$ | H | H |
| nOCCF$_2$.F.F | $C_nH_{2n+1}$ | $OCH_2CF_2H$ | F | F |
Preferred mixture components are shown in Tables A and B.
TABLE A
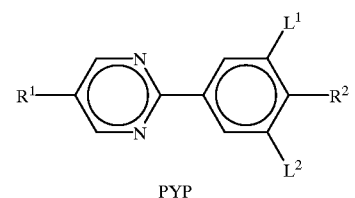
PYP
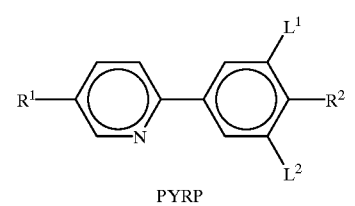
PYRP
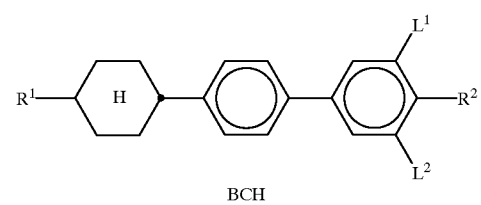
BCH
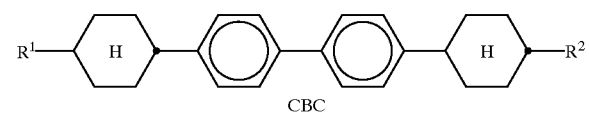
CBC
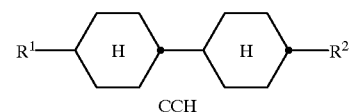
CCH
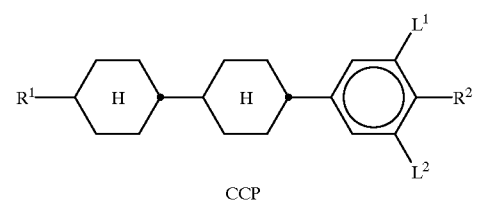
CCP
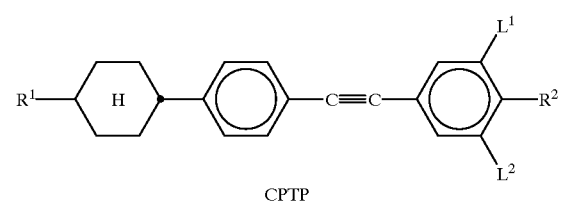
CPTP
TABLE A-continued
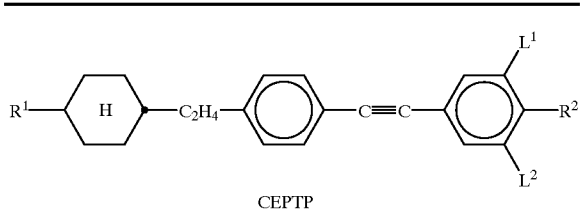
CEPTP
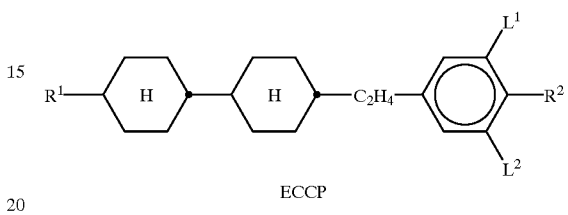
ECCP
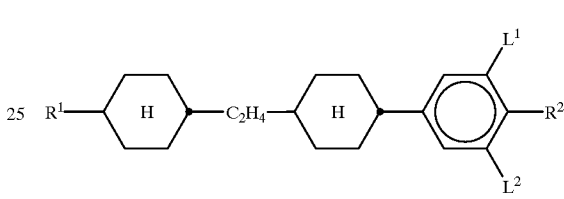
CECP
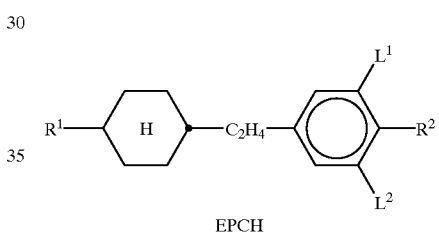
EPCH
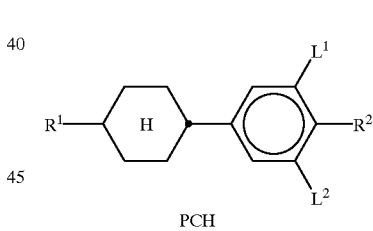
PCH
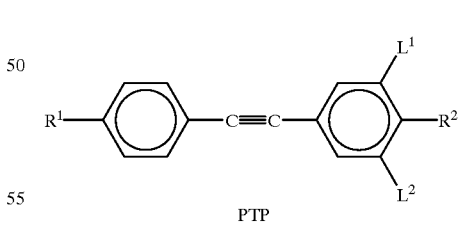
PTP
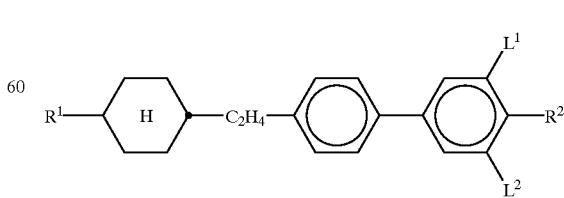
BECH

TABLE A-continued
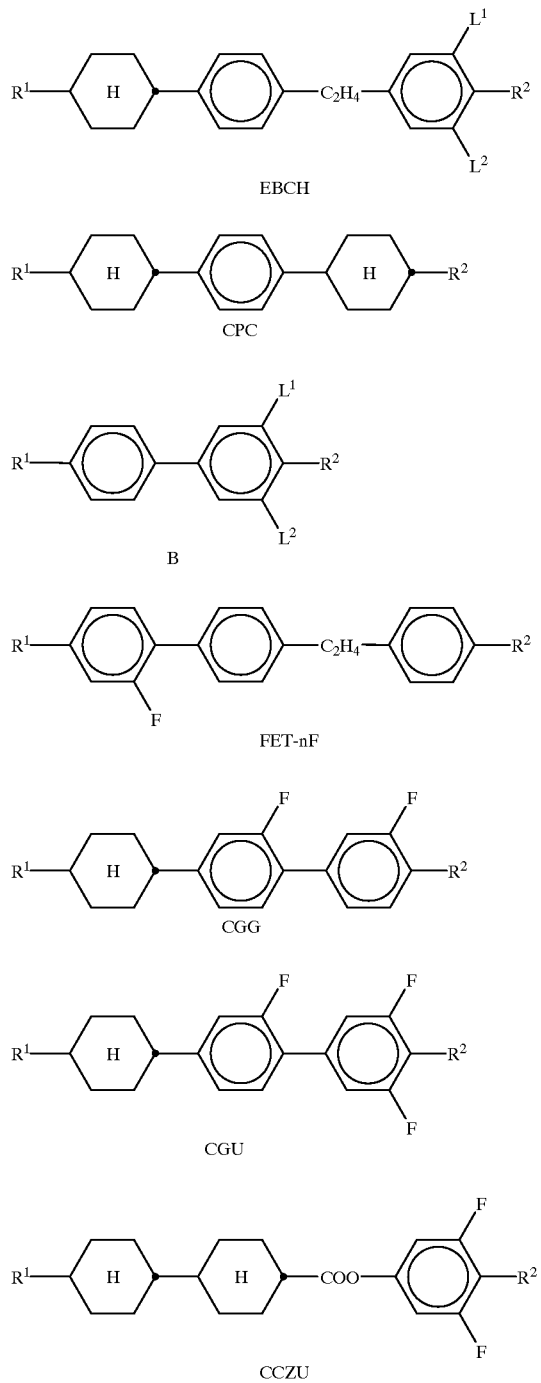
TABLE B
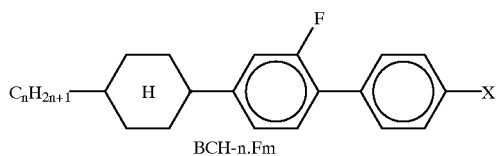
TABLE B-continued
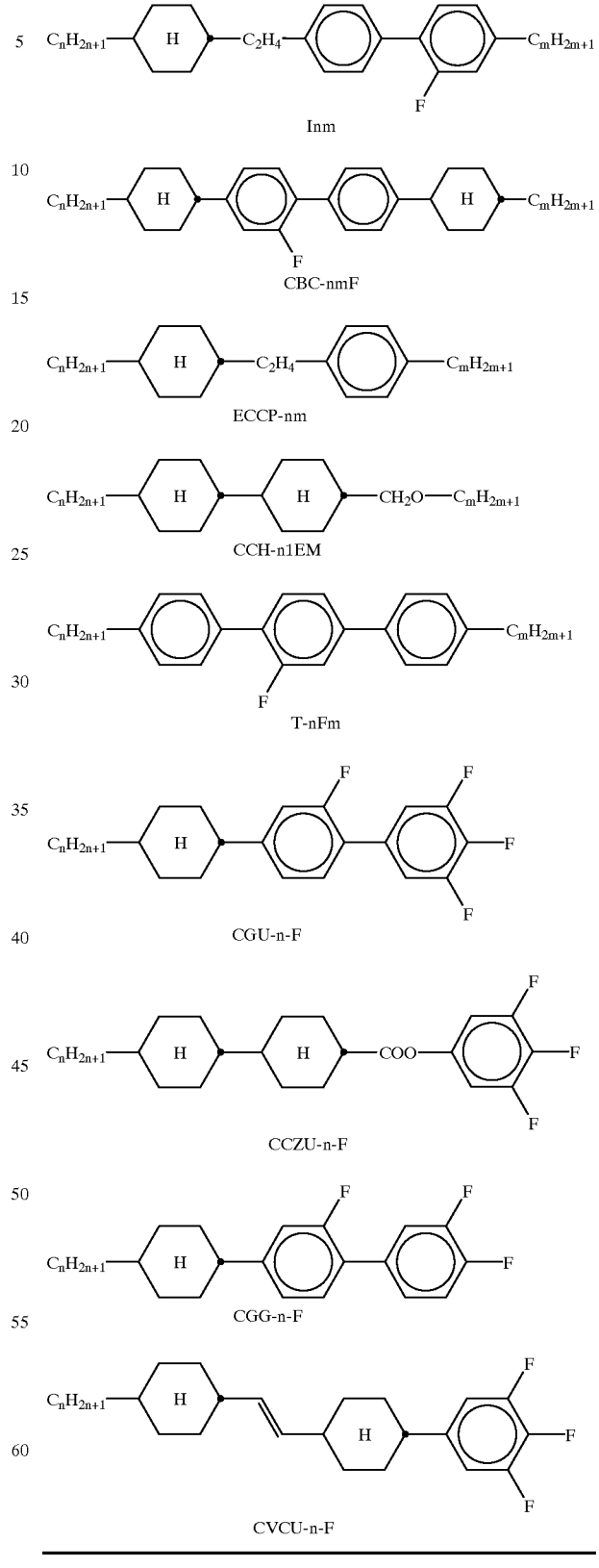
The examples below are intended to illustrate the invention without representing a limitation. Above and below, percentages are percent by weight. All temperatures are given in degrees Celsius. m.p. denotes melting point, cl.p. clearing point. Furthermore, C=crystalline state, N=nematic phase, S=smectic phase and I=isotropic phase. The numbers between these symbols are the transition temperatures. (Δ denotes the optical anisotropy (589 nm, 20° C.), and the viscosity (mm²/sec) was determined at 20° C.

EXAMPLE 1

| CCP-2F.F.F | 8.00% | Clearing point [° C.]: 70 |
|---|---|---|
| CCP-3F.F.F | 12.00% | (Δ [589 nm, 20° C.]: 0.0908 |
| CCP-3OCF$_3$ | 9.00% | V$_{(10,0,20)}$[V]: 1.07 |
| CCP-5OCF$_3$ | 9.00% | |
| CGU-2-F | 10.00% | |
| CGU-3-F | 13.00% | |
| CGU-5-F | 8.00% | |
| CVCU-2-F | 10.00% | |
| CVCU-3-F | 14.00% | |
| CVCU-4-F | 7.00% | |

EXAMPLE 2

| CCP-2F.F.F | 11.00% | Clearing point [° C.]: 69 |
|---|---|---|
| CCP-3F.F.F | 9.00% | Δn [589 nm, 20° C.]: 0.0902 |
| CCP-3OCF$_3$ | 10.00% | Δε [1 kHz, 20° C.] 10.2 |
| CCP-5OCF$_3$ | 9.00% | V$_{(10,0,20)}$[V]: 1.10 |
| CGU-2-F | 11.00% | |
| CGU-3-F | 13.00% | |
| CGU-5-F | 7.00% | |
| CVCU-2-F | 12.00% | |
| CVCU-3-F | 12.00% | |
| CVCU-5-F | 6.00% | |

EXAMPLE 3

| CCP-2F.F.F | 10.00% | Clearing point [° C.]: 64 |
|---|---|---|
| CCP-3F.F.F | 10.00% | Δn [589 nm, 20° C.]: 0.0873 |
| CCP-2OCF$_3$ | 5.00% | V$_{(10,0,20)}$[V]: 1.05 |
| CCP-3OCF$_3$ | 9.00% | |
| CGU-2-F | 12.00% | |
| CGU-3-F | 10.00% | |
| CGU-5-F | 7.00% | |
| CVCU-2-F | 12.00% | |
| CVCU-3-F | 13.00% | |
| CVCU-4-F | 8.00% | |
| CVCU-5-F | 4.00% | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A liquid-crystalline medium based on a mixture of polar compounds of positive dielectric anisotropy, comprising one or more compounds of the formula I

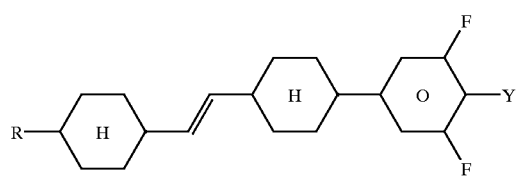

in which

R is H or an alkyl or alkoxy radical having 1 to 15 carbon atoms, and

Y is F, OCF$_3$ or OCHF$_2$, and one or more compounds of the formula II

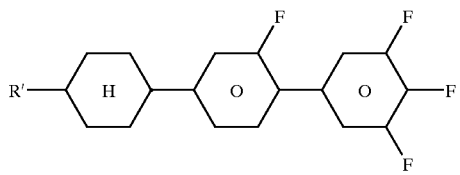

in which R', independent of the radical selected in the formula I, is as defined for R.

2. The medium according to claim 1, further comprising one or more compounds selected from the compounds of formulae III to X:

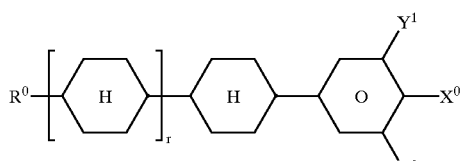

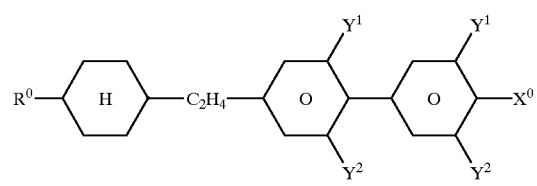

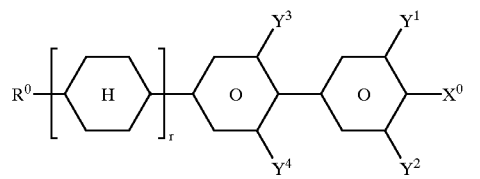

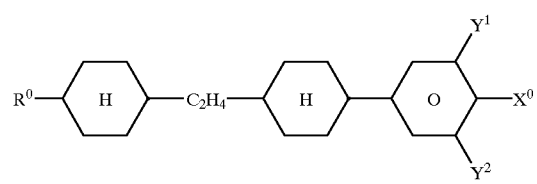

-continued

VII

[chemical structure: R⁰—[H]ᵣ—H—C₂H₄—O—ring(Y¹,Y²)—X⁰]

VIII

[chemical structure: R⁰—H—H—COO—O—ring(Y¹,Y²)—X⁰]

IX

[chemical structure: R⁰—H—dioxane—O—ring(Y¹,Y²)—X⁰]

X

[chemical structure: R⁰—dioxane—H—O—ring(Y¹,Y²)—X⁰]

in which the individual radicals have the following meanings:

R⁰: n-alkyl, oxaalkyl, fluoroalkyl or alkenyl, in each case having up to 9 carbon atoms;

X⁰: F, Cl, halogenated alkyl, alkenyl or alkoxy having 1 to 6 carbon atoms;

Y¹ and Y²: each, independent of one another, H or F;

Y³ and Y⁴: simultaneously H or F;

r: 0 or 1.

3. The medium according to claim 2, wherein the proportion of compounds of the formulae I to X together in the mixture as a whole is at least about 50% by weight.

4. The medium according to claim 1 wherein the proportion of compounds of the formulae I and II in the medium is from about 10 to about 95% by weight.

5. The medium according to claim 1 further comprising one or more compounds selected from the group of the general formulae XI to XVI:

XI

[chemical structure: R⁰—H—H—O—ring(Y¹,Y²)—X⁰]

XII

[chemical structure: R⁰—H—H—C₂H₄—O—O—ring(Y¹,Y²)—X⁰]

XIII

[chemical structure: R⁰—H—H—ring(Y¹,Y²)—O—O—X⁰]

XIV

[chemical structure: R⁰—H—H—C₂H₄—O—ring(Y¹,Y²)—O—X⁰]

XV

[chemical structure: R⁰—H—H—C₂H₄—H—ring(Y¹,Y²)—O—X⁰]

XVI

[chemical structure: R⁰—H—O—ring(Y¹,Y²)—O—H—X⁰]

R⁰: n-alkyl, oxaalkyl, fluoroalkyl or alkenyl, in each case having up to 9 carbon atoms;

X⁰: F, Cl, halogenated alkyl, alkenyl or alkoxy having 1 to 6 carbon atoms; and

Y¹ and Y²: each, independent of one another, H or F.

6. The medium according to claim 1, further comprising a compound of the formula

[chemical structure: R⁰—H—H—O—ring(Y¹,Y²)—X⁰]

in which

X⁰ is F, OCHF₂ or OCF₃

Y¹ and Y² are each, independent of one another, H or F, and

R⁰ is n-alkyl, oxaalkyl, fluoroalkyl or alkenyl, in each case having up to 7 carbon atoms.

7. The medium according to claim 1, further comprising one or more compounds selected from the group of the general formula IIIa, IIIb, IIIc, IIId, IIIe or combinations thereof:

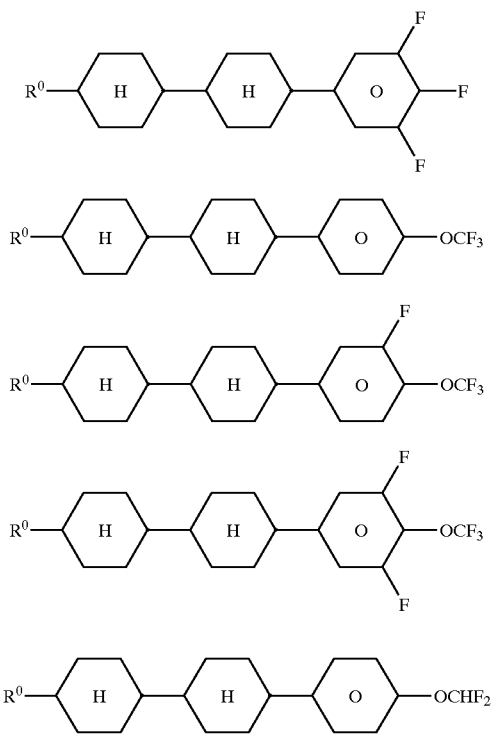

where R⁰ is n-alkyl, oxaalkyl, fluoroalkyl or alkenyl, in each case having up to 9 carbon atoms.

8. A method of preparing an electro-optical device incorporating the liquid-crystalline medium according to claim 1.

9. An electro-optical liquid-crystal display comprising a liquid-crystalline medium according to claim 1.

10. The medium according to claim 2, wherein the medium comprises compounds of the formulae I to VII.

11. The medium according to claim 2, wherein the weight ratio of compounds of the formulae I and II to compounds of the formulae III, IV, V, VI, and VII is about 1:about 10 to about 10:about 1.

12. The medium according to claim 2 further comprising one or more compounds selected from the group of the general formulae XI to XVI:

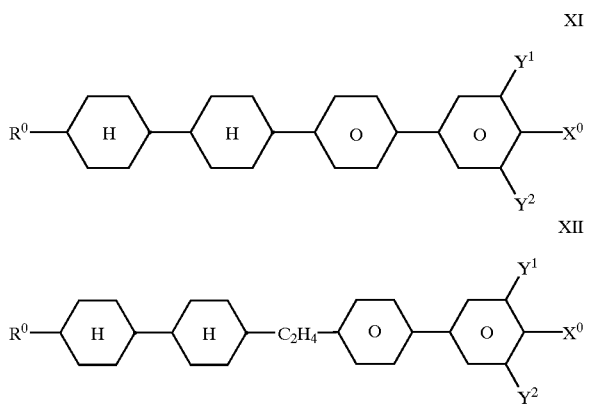

$R^0$: n-alkyl, oxaalkyl, fluoroalkyl or alkenyl, in each case having up to 9 carbon atoms;

$X^0$: F, Cl, halogenated alkyl, alkenyl or alkoxy having 1 to 6 carbon atoms; and $Y^1$ and $Y^2$: each, independent of one another, H or F.

13. The medium according to claim 12 consisting essentially of compounds of the general formula I to XVI.

14. The medium according to claim 1 which comprises a plurality of compounds of formula I with their proportion being about 20 to about 50 weight percent of the medium and a plurality of compounds of the formula II with their proportion being about 20 to about 50 weight percent of the medium.

15. The medium according to claim 4 wherein the proportion of compounds of the formula I and II in the medium is from about 20 to about 70% by weight.

16. A medium according to claim 1, further comprising compounds of the following formula:

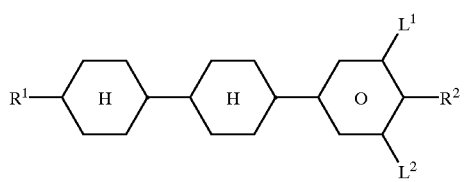

where:
a first compound $R^1$ is ethyl, and $R^2$, $L^1$, and $L^2$ are F;
a second compound $R^1$ is propyl, and $R^2$, $L^1$, and $L^2$ are F;
a third compound $R^1$ is propyl, $R^2$ is —OCF₃, and $L^1$ and $L^2$ are H; and
a fourth compound $R^1$ is pentyl, $R^2$ is —OCF₃, and $L^1$ and $L^2$ are H.

17. A medium according to claim 1, wherein R is ethyl, propyl, butyl, pentyl, hexyl, heptyl, ethoxy, propoxy, butoxy, pentoxy, hexoxy, heptoxy, methyl, octyl, nonyl, decyl, undecyl, dodecyl, tridecyl, tetradecyl, pentadecyl, methoxy, octoxy, nonoxy, decoxy, undecoxy, dodecoxy, tridecoxy or tetradecoxy.

18. A medium according to claim 1, wherein R is isopropyl, 1-methylpropyl, 2-methylpropyl, 2-methylbutyl, 3-methylbutyl, 2-methylpentyl, 3-methylpentyl, 2-ethylhexyl, 2-propylpentyl, isopropoxy, 2-methylpropoxy, 2-methylbutoxy, 3-methylbutoxy, 2-methylpentoxy, 3-methylpentoxy, 2-ethylhexoxy, 1-methylhexoxy or 1-methylheptoxy.

19. A medium according to claim 1, wherein R is methyl, ethyl, n-propyl, n-pentyl or n-heptyl.

20. A medium according to claim 1, wherein R is ethyl, n-propyl, n-butyl or n-pentyl.

* * * * *